US010881244B2

(12) United States Patent
Stumphauzer et al.

(10) Patent No.: US 10,881,244 B2
(45) Date of Patent: Jan. 5, 2021

(54) LID ASSEMBLY FOR STOVE TOP CONVECTION COOKING

(71) Applicants: William C. Stumphauzer, Avon, OH (US); Joel Steven Marks, Sherman Oaks, CA (US)

(72) Inventors: William C. Stumphauzer, Avon, OH (US); Joel Steven Marks, Sherman Oaks, CA (US)

(*) Notice: Subject to any disclaimer, the term of this patent is extended or adjusted under 35 U.S.C. 154(b) by 89 days.

(21) Appl. No.: 15/634,507

(22) Filed: Jun. 27, 2017

(65) Prior Publication Data

US 2018/0035842 A1    Feb. 8, 2018

Related U.S. Application Data

(60) Provisional application No. 62/371,966, filed on Aug. 8, 2016.

(51) Int. Cl.
*A47J 36/06* (2006.01)
*A23L 5/10* (2016.01)
*A47J 37/10* (2006.01)

(52) U.S. Cl.
CPC .......... *A47J 36/06* (2013.01); *A23L 5/10* (2016.08); *A23L 5/17* (2016.08); *A47J 37/101* (2013.01)

(58) Field of Classification Search
CPC ..... A23L 5/17; A47J 37/0623; A47J 37/0641; A47J 37/101; A47J 37/103; A47J 39/003; A47J 36/06; A47J 45/074; F24C 15/322
USPC .......................................... 99/523
See application file for complete search history.

(56) References Cited

U.S. PATENT DOCUMENTS

| 893,469 | A | | 7/1908 | Essmuller | |
|---|---|---|---|---|---|
| 2,523,796 | A | * | 9/1950 | Weeks | ............ A47J 37/0641 219/400 |
| 2,696,816 | A | | 5/1952 | Barber et al. | |
| 4,138,937 | A | | 2/1979 | De Weese | |
| 4,561,348 | A | * | 12/1985 | Halters | ............ F24C 15/322 126/21 A |
| 4,728,762 | A | | 3/1988 | Roth | |
| 4,817,509 | A | | 4/1989 | Erickson | |

(Continued)

FOREIGN PATENT DOCUMENTS

| CN | 203848012 U | * | 9/2014 | ............ F21L 4/00 |
|---|---|---|---|---|
| EP | 0284420 A1 | | 9/1988 | |

(Continued)

OTHER PUBLICATIONS

Abstract, Bai, CN 203848012 (Year: 2014).*

*Primary Examiner* — Erin E McGrath
(74) *Attorney, Agent, or Firm* — Rankin, Hill & Clark LLP (57) ABSTRACT

A lid assembly that can be placed on a pan having a bottom surface that is configured for placement on a burner of the stove top with one or more foods to be cooked supported above an inner bottom surface of the pan by a rack. The lid assembly covers the pan and thereby encloses the one or more foods to be cooked and the rack within a cavity defined by the pan and the lid assembly. An air flow generator mounted on a shaft that extends through a cover portion of the lid from a motor disposed on an opposite side of the cover portion rotates the shaft to produce airflow within the cavity. The lid assembly cooks foods in less time and using less energy than normally required with a conventional oven.

16 Claims, 3 Drawing Sheets

(56) References Cited

U.S. PATENT DOCUMENTS

| | | | | |
|---|---|---|---|---|
| 5,372,422 A | * | 12/1994 | Dubroy | A47J 36/165 |
| | | | | 366/143 |
| 5,373,607 A | * | 12/1994 | Hwang | A47L 7/0066 |
| | | | | 15/344 |
| 5,466,912 A | | 11/1995 | Dornbrush et al. | |
| 5,584,414 A | * | 12/1996 | Neubeck | A47J 36/06 |
| | | | | 16/431 |
| 5,816,136 A | | 10/1998 | Stallings | |
| 5,848,841 A | * | 12/1998 | Wu | A47J 43/044 |
| | | | | 366/129 |
| 6,286,990 B1 | | 9/2001 | De Zuazo Torres et al. | |
| 9,409,364 B2 | | 8/2016 | Anthony | |
| 2002/0040711 A1 | * | 4/2002 | Anthony | A47J 37/101 |
| | | | | 126/381.1 |
| 2003/0062360 A1 | * | 4/2003 | Moon | A47J 37/0623 |
| | | | | 219/481 |
| 2004/0069154 A1 | * | 4/2004 | Stefanoni | A47J 36/06 |
| | | | | 99/408 |
| 2005/0034716 A1 | | 2/2005 | Harbin | |
| 2009/0229476 A1 | | 9/2009 | Bedard | |
| 2011/0120319 A1 | * | 5/2011 | Chang | A47J 37/0623 |
| | | | | 99/409 |
| 2011/0236549 A1 | | 9/2011 | Bedard | |
| 2012/0298667 A1 | | 11/2012 | Anthony | |
| 2015/0090716 A1 | | 4/2015 | Wilson | |
| 2017/0127879 A1 | * | 5/2017 | Hsu | A47J 37/042 |

FOREIGN PATENT DOCUMENTS

| | | |
|---|---|---|
| FR | 934357 A | 5/1948 |
| FR | 2409736 A1 | 6/1976 |
| GB | 2007515 A | 5/1979 |

\* cited by examiner

LID ASSEMBLY FOR STOVE TOP CONVECTION COOKING

CROSS-REFERENCE TO RELATED APPLICATIONS

This application claims priority to U.S. Provisional Pat. App. Ser. No. 62/371,966, filed Aug. 8, 2016, which is hereby incorporated by reference in its entirety.

BACKGROUND OF INVENTION

Field of Invention

The present invention relates to a lid assembly that can be used with a cooking pan to cook food on a stove top at least in part by convection. More particularly, the invention relates to a lid assembly that includes an air flow generator driven by a motor supported by a handle assembly of the lid assembly.

Brief Description of Related Art

A conventional oven is a kitchen appliance used for cooking or heating food. Modern ovens are typically fueled by either natural gas or electricity and are often contained in a kitchen stove, which has a top surface with pre-defined burners on which cooking pans can be placed.

Most conventional ovens include a heating element, which provides heat below food contained in the oven, which is supported on a rack. Modern ovens may also include a top heating element for broiling.

In the 1960's, fans were introduced into conventional ovens to circulate air, which increases the speed at which food is cooked by means of convection. Other convection ovens are known, including table top convection ovens, which include a fan and a heat source.

Ovens, whether conventional, convection or table top, are difficult to clean and tend to be much larger in volume than is necessary to prepare most foods. In addition, table top convection ovens, roasters and other cooking appliances take up counter space and storage space.

BRIEF SUMMARY OF THE INVENTION

The present invention is directed to a lid assembly that can be placed on a cooking pan having a bottom surface configured for placement on a burner of the stove top. Food to be cooked is placed on a rack disposed within the pan such that the food to be cooked is supported above an inner surface of the pan. The lid assembly covers the pan and thereby enclosing the one or more foods to be cooked and the rack within a cavity defined by the pan and the lid assembly. The lid assembly includes a cover portion that spans an opening defined by the pan, an air flow generator mounted on a shaft that extends through the cover, and a handle assembly supporting a motor, which is disposed on an opposite side of the cover portion from the air flow generator. Rotation of the air flow generator by the motor disposed in the handle assembly produces airflow within the cavity, which allows the food supported on the rack within the cavity to cook in less time and using less energy than normally required with a conventional oven.

In a preferred embodiment, the motor is a direct current (DC) motor powered by one or more batteries, which can be rechargeable. It will be appreciated that power can be provided by alternative sources such as through power cords from AC outlets. The shaft may be supported by a bearing in the cover portion. The handle assembly and air flow generator are each configured such that they can be separated from the cover portion. This enables the pan, the rack, the air flow generator, the non-electric portions of the handle assembly and the cover portion to be washed in a dishwasher and then reassembled for use. Preferably, the cover portion is at least partially transparent, which allows one to observe the food while it is being cooked. The lid assembly can be provided as part of a kit, which contains one or more air flow generators, which can be the same or different in size or configuration (e.g., pitch), thus allowing a single handle assembly to be coupled to a variety of different portions and/or air flow generators.

In various preferred embodiments, the air flow generator is in the form of a simplified high efficiency centrifugal fan. The handle assembly supports a battery compartment for supporting a battery power supply, which preferably at least partly surrounds the motor in such a manner that the batteries substantially occupy a same vertical position as the motor. This arrangement contrasts, for example, with a battery pack that is mostly or entirely above the motor whereby the motor/handle assembly is in height additive of at least both the motor and the batteries. The term "battery" or "batteries" as used in the specification and claims refers to a container consisting of one or more cells in which chemical energy is converted into electricity and used as a power source.

According to a preferred embodiment the air flow generator is a modified centrifugal type fan. A simple two blade structure provides a low cost and durable fan. The fan includes a shallow S plan view shape with air intake and ejection elements. By pulling air upward at a center and expelling it outward at the top of the enclosed pan space, as the air is also spun around the pan, a complex but efficient air motion results. In contrast a common multi blade propeller fan provides primarily vertical air motion. In a typical wide but short space of a pan this vertical air motion is not efficient since there is minimal vertical space available for the air to move.

Preferably, one or more radiant barriers faces an air gap between the handle assembly and the heated interior of the pan. In the case that the cover portion of the lid is made from transparent glass, the barrier may be a reflective coating on the glass. The barrier may also be a separate structure under or atop the cover portion of the lid. The barrier should be about a same or similar diameter or equivalent shape as the handle/motor assembly so that the assembly is isolated from radiant heat in the cooking area. The transparent cover structure beyond the handle assembly and barrier is available for viewing the cooking space.

The fan and handle assembly are detachable from the cover portion so that the individual components that form the lid assembly may be washed separately. The parts may be coupled together by a twist locking action or by an axial pressed friction fit.

Preferably, a large switch button is fitted to a top most position on the handle assembly. In a preferred embodiment, the button is vertically movable to enable easy operation by a user. For example, when the user's hands are covered with food substances the user can operate the switch by engaging the switch with an elbow or back of the wrist. In contrast, a slide switch or less prominent button requires fingers to operate.

An optional secondary cooling system may be included to further cool the motor and/or batteries. In a preferred embodiment, the secondary cooling system includes a small fan fitted to an upper end of the motor shaft, which is configured to draw in ambient air from above the lid as cooling air, and expel the drawn-in cooling air back out from slots provided in sides of the motor/handle assembly.

The invention also provides methods for cooking a food using the lid assembly, and methods for disassembling and cleaning the lid assembly after use.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

With reference to the accompanying drawing figures, please note that.

DETAILED DESCRIPTION OF THE INVENTION

In the present invention, the lid assembly converts a common pan, pot, cooking utensil, baking sheet or equivalent similar food-supporting device into a convection cooking appliance. The lid assembly forms at least part of an enclosure for food and a powered air flow generator while a non-integral or separable heat source provides the heat required to cook the food. In the preferred embodiment, the burners of a stove serve as the heat source. But it will be appreciated that various features of the invention could be incorporated into devices that utilize a heat source other than the burners of a stove (e.g., a grill, a propane-fueled torch, a campfire, an infrared source that radiates heat through the cover portion from any side etc.). The cover portion of the lid is preferably in a dome shape as shown in the accompanying figures so as to accommodate food in a pan that may extend above a rim of the pan. However, the cover portion can be taller (e.g., to allow the cover portion to sit on a flat baking sheet that has no upwardly extending sidewall) or shallower (e.g., to rest upon a stock pot or other food cooking utensil with high side walls) than illustrated in the accompanying figures without departing from the invention. In some embodiments, the cover portion of the lid included one or more vent holes located away from the handle assembly so that steam can escape during cooking. A rim 11 of the lid may include a steel alignment ring portion or other structure distinct from cover portion 10 whereby the lid is a combination of a ring or other portion and a cover portion.

While portable convention cooking devices are known, such devices are not compact, efficient nor convenient. One advantage of the lid assembly of the present invention is convenient storage. The lid assembly adds convection cooking ability to a conventional pan or other cooking utensil while the lid assembly is physically separable from a pan with which it is used. Therefore enjoying the benefits of convection cooking requires only adding the lid assembly to a household appliance collection. The handle/motor assembly and air flow generator are preferably easily separable from the lid. This allows especially compact storage a well as easy cleaning of the separated parts.

Figures 3, 4, 5, 6, 7, 8:
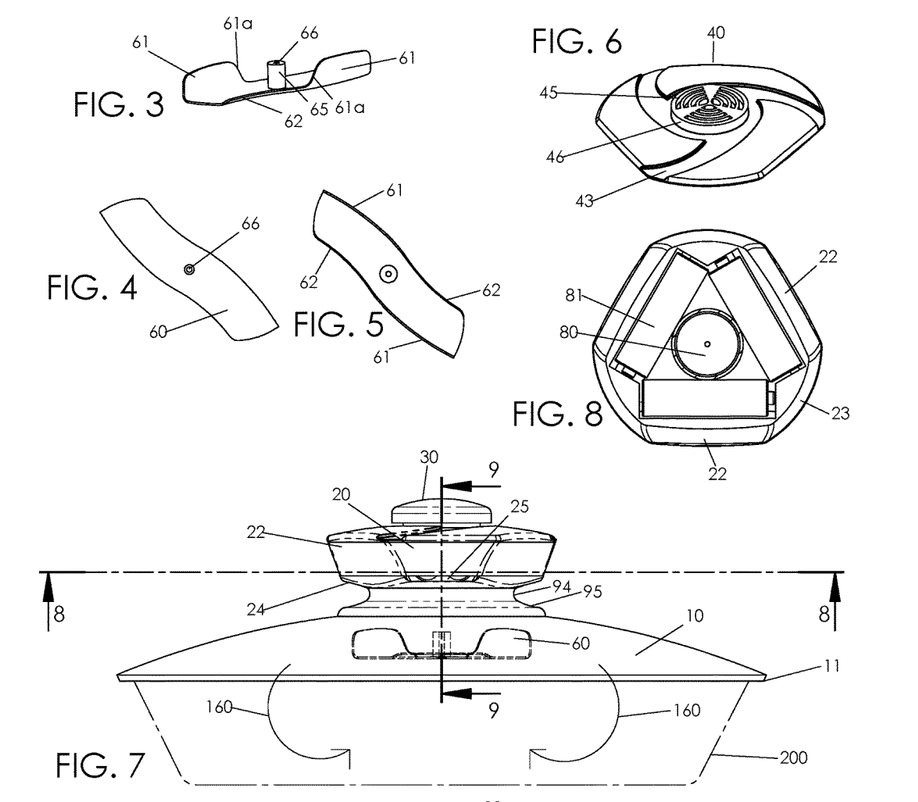
FIG. 3 is perspective view of an air stirring fan.
FIG. 4 is a bottom view of the fan of FIG. 3.
FIG. 5 is a top view of the fan of FIG. 3.
FIG. 6 is a top perspective view of a handle/motor assembly cover.
FIG. 7 is a side elevation of a lid assembly with a handle/motor assembly and pan in phantom.
FIG. 8 is a partial section view of a handle/motor assembly.

The lid assembly of the invention is preferably used with pans of between about 9 to 12 inches diameter, although other sizes are contemplated. FIG. 7 shows an exemplary pan 200 in phantom. In this scale, using the structures disclosed herein, it has been found that power and battery life are well matched using three standard alkaline AA batteries in series for a nominal voltage of about 4.5. Accordingly an adequate convection action will last for about 1 to about 8 hours. A DC motor appropriate for this use is about 1 inch in diameter and in height while other sizes and shapes may be used. At the same time a handle/motor assembly should be sized and shaped to keep the batteries and motor from over exposure to the hot cooking chamber below. The handle should be easy to grasp and lift the lid weight, while keeping the fingers away from the lid surface. In the illustrated embodiment, the motor drives the shaft directly. It is possible to orient the motor in other ways (e.g., horizontally with a right angle drive) to rotate the shaft.

Figure 9:
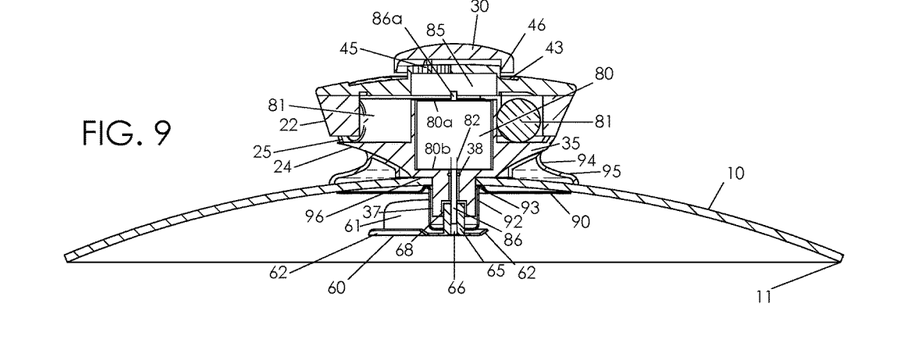
FIG. 9 is a section view of the assembly of FIG. 7.

Within the above described constraints, or any other related constraints, a handle assembly preferably includes a wide base, a narrower mid-section, and a flared, wider top part as seen in FIG. 7. In FIGS. 8 and 9 it is seen that batteries, or cells, 81 are arranged tightly around motor 80. In FIG. 9 batteries 81 are at least in majority at a same vertical position (i.e., height) of the lid assembly as the motor. This is practical using the triangular circumferential layout of FIG. 8. Alternately the batteries can be placed entirely above the motor in an adjoining parallel arrangement. However this saves minimal space with respect to the top view of FIG. 8 and requires the handle/motor assembly to be increased in height by the battery diameter. With the preferred structure illustrated there is an at least partly enclosed battery compartment surrounding motor 80 structured or configured to support and thus hold the batteries below a top of the motor and spaced above the lid. The handle thus remains a reasonably normal height while being narrow below the batteries and of a larger diameter above that level to fit the batteries and also form a lifting handle structure as described below.

As shown batteries 81 are cylindrical cells arranged with a cylindrical axis parallel to the page of FIG. 8. This orientation may also be described as being axially parallel to a plane described by lid rim 11, perpendicular to an axis of shaft 86. The orientation described is in contrast to the batteries being vertical, however the horizontal orientation may include being angled toward vertical, for example with the batteries angled axially up to about 20 degrees off the horizontal. As shown cylindrical batteries 81 are arranged end to end at respective battery axis angles, such angle being 60 degrees in the illustrated compact 3-battery configuration. With a motor of about one inch diameter and an AA cell, the triangular battery arrangement shown packs tightly with each battery in nearest practical tangent contact or adjacent tangent spacing to the motor body. In FIG. 9, the motor body is the structure of the motor between motor top 80*a* and motor bottom 80*b*, being the portion that normally supports an armature and stator within. This may be described as being substantially tangent to the motor body exterior. The batteries are further nearest practical to each other as shown, with a thin insulator for example separating them. The batteries circumferentially surround a vertical axis of the motor and may be described as forming a ring of battery cells around the motor. With respect to a structure of the handle/motor assembly, a battery compartment forms a structure able to support the ring of batteries, this being independent of whether batteries are present in the compartment. The motor axis is defined by shaft 86 or other rotating output linked to the motor. Thus the grip size of the handle is not excessive being in the range of 3 inches in the exemplary case. It is contemplated that batteries may also be oriented axially perpendicular to the plane of rim 11.

Other battery combinations, types or power sources may be used. For example the batteries may be C cells, rechargeable, in a pack remote from the motor or other structures or non-cylindrical. A further option is to use a line powered adapter. In this case a wire would lead from the adapter to the handle/motor assembly. Preferably such a wire would be insulated with a fluoropolymer such as PTFE or PFA, or a polyimide material suitable for high temperatures that could occur where the wire passes over a heat source outside the pan.

Figure 1:
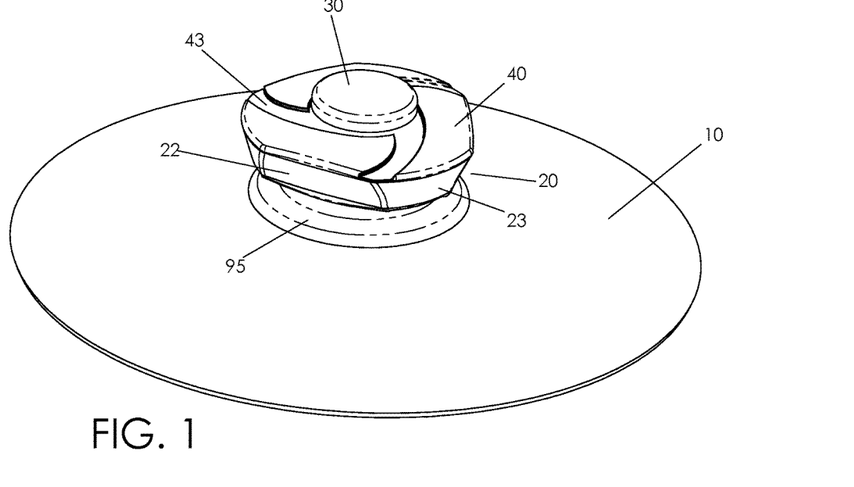
FIG. 1 is a top perspective view of a lid assembly including a cover portion with a handle/motor assembly and fan.
Figure 2:
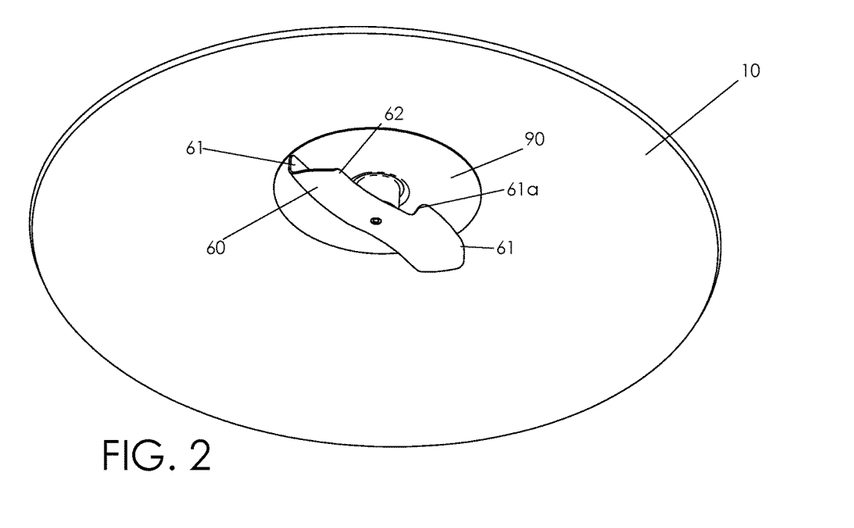
FIG. 2 is a bottom perspective view of the lid assembly of FIG. 1.

As seen in FIGS. 1 and 8 handle 20 is a truncated circular shape, in particular a partial triangle at flattened sides 22 between arcuate side portions 23. This follows the packing of the batteries and allows for a reduced overall handle size. The handle is therefore easier to grasp compared to a simple circular shape, although a circular shape remains functional and may be used.

The walls of handle 20 are preferably angled to face partly downward as shown, with sides 22 also being so angled. There is also a more downwardly facing portion 24 of handle 20, FIG. 7. The faces 22 and 24 together surround exemplary battery 81 from beside and below, substantially following the cylindrical shape or contours of each battery 81 in a transverse section view as seen in the right side part of FIG. 9. This compact battery compartment both houses the batteries and forms a practical and intuitive lifting device. It is easy to lift the lid by grasping the handle and pulling upward on the downward angled external face or faces 22, 23, and/or 24. A user can be confident that the lid will not slip from the fingers even if the fingers have food grease. Preferably the downward angled faces are circumferential around the handle assembly as shown so that any finger gripping position will find a downward face. Optionally the downward faces may be localized, for example downward only at flattened side portions 22 and near vertical at arcuate side portions 23 wherein a user is drawn to the flattened portions by visual guidance of the shape from above, specifically that the flattened portions require a smaller grip size than the arcuate portions.

According to an alternate embodiment described above the battery compartment is entirely above the motor. In this case the compartment may retain downwardly angled sides 22 and/or 23 and underside 24, with these structures moved to a position entirely above motor 80 in FIG. 9. This handle assembly also has a wider top portion (the battery compartment-sometimes hereinafter referred to as a "second portion") and narrower section at the level of motor 80 (sometimes hereinafter referred to as a "first portion") so the alternate handle assembly is easily lifted by pulling up on the downward facing features or "downward faces".

The handle assembly includes finger guard 95 and narrow portion 94, with narrow portion 94 surrounding motor 80 and being below the downward angled faces of the battery compartment. This structure gives clearance for grasping sides 22 or 23, or underside 24, and to define the sides more clearly. Finger guard 95 prevents accidental direct contact to the surface of cover portion 10. It follows that narrow portion 94 is taller and deeper than a cosmetic groove or shallow contour whereby the downward faces are large enough that a finger can usefully grasp.

An interior of the pan may have temperatures up to 450° F. depending on what is being cooked. So it is desired that the structures of the handle/motor assembly be thermally isolated to an extent practical while keeping the structure compact. Accordingly a further function of finger guard 95 is as a radiant barrier between preferably glass cover portion and/or the interior cooking space below the lid, and the handle/motor assembly. In this context the upper face of the finger guard is preferably a low thermal conductor such as plastic. ABS plastic may be adequate, alternately the finger guard and other elements of the handle assembly may be polycarbonate, nylon or other material for higher temperature performance. With a low conductance material the finger guard will not transfer heat in excess to a contacting finger. For low radiant heat transmission the finger guard is preferably coated in a light color paint, thin metallic plating or other low emissive (low e) material. Finger guard 95 preferably extends to a similar diameter as handle 20 to provide both the physical and radiant protection described. Beyond this feature the transparent glass can provide a view of the cooking contents in pan 200.

A second radiant barrier 90 is shown under the cover portion 10 of lid assembly. This feature should be of metallic or other high temperature tolerant material construction since it is exposed to the full interior cooking temperature environment. It should be preferably a bright finish for low emissivity. An air gap is seen above barrier 90 to reduce conductive heat transmission. Barrier 90 as shown can provide a second attaching function, which is discussed later. Barrier 90 may be a film, plating or other low e coating on the glass portion of cover portion 10. While this would not provide the air gap, it may be a lower cost option. Preferably barrier 90 is of similar diameter or top view shape as handle 20 to shield the handle from heat emissions while maintaining a view of the pan contents beyond barrier 90. The radiant barrier in various possible locations blocks vertical exposure of downward angled external face or faces 22, 23, and/or 24, or other exposed features of the handle assembly, to the heated internal cooking space within pan 200 under cover portion 10.

For best battery life the batteries should not get excessively hot during use. As seen in FIG. 7 the batteries are spaced above cover portion 10 with at least a partial length of motor 80 separating the two features. In FIG. 9 this spacing is about one AA size battery diameter while a top of the battery is at or near a top of motor 80. Specifically the exemplary circular section of battery 81 is tangent, or nearly so, with a top end of the motor with the battery diameter or girth extending downward from the top of the motor. Preferably the battery is at least ¼ to ½ inch away from the nearest top surface of the cover portion 10. More generally the batteries, including a central horizontal battery axis, are at a same vertical level as the motor body, with the battery axis preferably being below but near a top of the motor body. As described here the battery axis is central to the diameter or width of the battery, this being at the location of the right leader for 81 in FIG. 9. With effective radiant barriers as described earlier the battery-lid spacing may be at the lower end. But to prevent conductive heat transfer the batteries should not make contact to the cover portion of the lid. The spacing as shown, at least about one battery diameter, provides a handle formed by the battery compartment with a natural gripping distance from cover portion 10 as discussed above.

Battery cover 40, FIG. 6, fits atop handle 20. It may be detachable from handle 20 for battery changing by pulling against a snap fit or by turning upon handle 20 on a screw thread or bayonet fitting. Preferably both fan 60 and the handle/motor assembly are detachable for cleaning and/or storage. Fan 60 includes central hole 66 to fit motor shaft 86. A resilient seal may surround motor shaft 86, for example at groove 38, FIG. 9. The seal should be pliant so that it does not cause friction from fitment tolerance as discussed below. A gasket may also be used for example at interface 96 between the handle assembly and the cover. Further barrier 90, including recess 92 and/or hump 93 can serve as a sealing gasket between cover portion 10 and the handle assembly. The gasket prevents steam (and heat) from rising through the hole and into the handle assembly. Without a gasket or other sealing element, steam could rise into the handle and escape through any openings or gaps that exist between the components of the handle. The gasket can be made of silicone, metal or other sealing material. The gasket could also be integrated into the handle assembly such that it surrounds motor shaft 86 and thus insure that any seams or other areas where steam might penetrate into the handle are sealed off.

A resilient element such as a spring wire or clip may be fitted to fan hub 65 to retain the fan to the shaft by friction. A flat may be provided in shaft 86 to prevent rotational slippage from the torque connection between the motor and fan. The fan is removed from the motor shaft by pulling downward in FIG. 7. The fan may also be retained to shaft 86 by screw threads.

For attaching the handle/motor assembly barrier 90 may include recess 92. Handle base 35 then includes hub 37. Recess 92 and hub 37 may be respectively threaded whereby spinning the handle assembly upon cover portion 10 secures the handle assembly to the lid via recess 92. Other structures may attach the handle assembly to the lid. For example barrier 90 or equivalent structure may have a central non-round hole which fits a non-round feature of handle base 35 in a bayonet fixing action. As described the handle/motor assembly is attached to cover portion 10 and fan 60 is separately attached to the handle/motor assembly. Both operations can be done as a normal operating procedure without tools such as a screwdriver or the like. With the handle assembly and fan detached from cover portion 10, and fan 60 can be cleaned after use. Prior convection cooking appliances do not suggest structures to enable normal separation of a convection air stirring apparatus from a lid.

Figure 10:
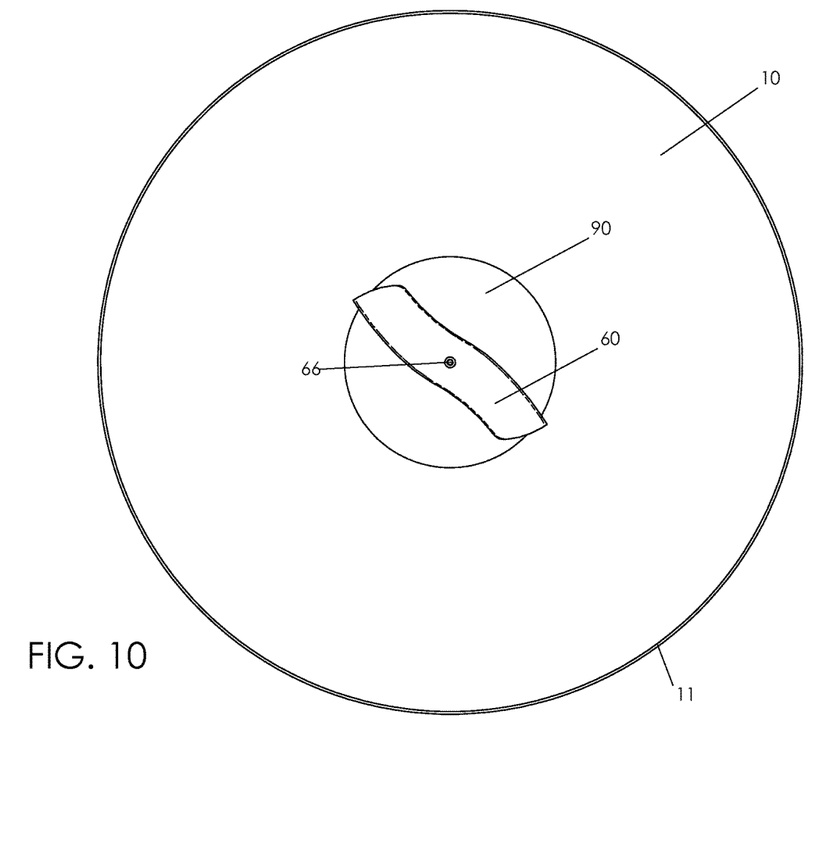
FIG. 10 is bottom view of the lid assembly of FIG. 1.

Fan 60 is preferably an elongated structure as shown to form an air-stirring fan. It may be made from stainless steel or aluminum or other temperature resistant material. It includes paddles 61 at opposed ends and preferably rotates counter clockwise in the views of FIGS. 4 and 10. Paddles 61 are lightly curved in these views to form a shallow S shape with advancing faces of the paddles facing outward relative to a radial from the spin axis. The paddles extend only partly along a length of the fan, terminating at edge 61a. Beyond edge 61a a small lip 62 provides an airfoil shape (FIG. 9 section view) to the fan transverse section. Lip 62 also reinforces the fan against bending. In action fan 60 moves output air outward from the centrifugal action of paddles 61 augmented by the off-radial angle of the S curve on the paddles. The input air is drawn in above the location of lips 62 from below the fan. The effect is a complex air motion within the pan. In FIG. 7 transverse air motion cells 160 show the radial input/output air motion. A further air motion is about the spin axis, counterclockwise with respect to FIG. 10. So there is both transverse radial and spin-axis air rotation from the motion of fan 60. The resulting highly turbulent environment ensures that food within the pan receives the full benefit of convective cooking. Notably there is no need to eject air to or from the limited space above fan 60. It will be appreciated that the fan can be configured to force air to flow within the cavity defined between the lid and the pan in the opposite direction as previously described, if desired.

Optionally a common multi-blade propeller may be used instead of air stirring fan 60. Empirical testing has shown this common fan uses substantially more power to provide a less complex air motion. For example a four bladed propeller may use 20-30% more current at a same voltage with no advantage in air motion. This is a result of the shape constraints of the associated pan and lid. As seen in FIGS. 7 and 9 fan 60 should be close as possible to cover portion 10 for clearance to food below the fan. Fan 60 is therefore preferably entirely above a lowest rim 11 of cover portion 10. The close fitment of fan 60 to the handle assembly also provides that the fan can preferably be directly and stably mounted to motor shaft 86, with the shaft being supported on motor bearing area 82. Then, there is no need for intervening bearings or extenders. For example the gap at 68 in FIG. 9 allows for tolerance of the fit between the cover or handle assembly and fan 60 or motor 80 whereby the fan hub or motor shaft will not rub with excess friction. However as discussed above a bearing or seal may be used here. A propeller fan primarily moves air axially, that being the purpose of such fans. With the fan adjacent to the lid interior for food clearance there is little space above to allow for axial air motion. It follows that the fan is effectively blocked from proper function and it cannot operate efficiently.

A further advantage of the preferred elongated fan 60 is a sturdier structure. A four blade propeller fan necessarily has large outer blade portions with a narrow neck or root. The large outer area is easily bent about the narrow root to deform and damage the fan. In contrast fan 60 has continuous reinforcement by lips 62 along its length, and less blade area to get bumped. Finally fan 60 is lower cost to manufacture since it is an elongated form. When stamped from flat metal stock paddle portions 61 can nest to an adjacent blank for minimal material waste.

Control button 30 is fitted atop the handle/motor assembly to start and stop the motor operation. It is desirable that the motor operate no longer than required to save battery life. Further, if fan 60 has become oily for example, it is best to shut it off before lifting the lid so that the oil will not spray outside the pan. So button 30 should operate quickly and easily. The button fits over boss 46 of battery cover 40 with undercut snaps preferably holding the button in an upper limited operative position. This overlap at boss 46, or equivalent structure, prevents dripping liquids from entering the motor cavity. Button 30 is movable axially with the clearance for such motion toward face 43 seen in FIG. 9. Button 30 is spring biased to the upper position shown and linked to an on-off switch, for example in the space at 85. Button 30 is large, being preferably at least the diameter of motor 80 or greater as shown and centrally aligned to be coincident with an axis of motor shaft 86. The button is further a protruding top most feature of the handle/motor assembly. With the structure as described button 30 is well exposed and easily operable with a single hand or with no hand at all. For example if the user's hands are covered with food grease button 30 can be operated by an elbow or back of the wrist while the lid assembly does not get soiled by the grease. There is no adjacent structure to interfere with the imprecise contact of these user arm elements. Button 30 includes a preferably rounded top to focus pressure toward the center, away from the edges. With centralized pressure the button is less prone to tilting whereby a linked switch may not reliably operate. It is also contemplated that a "kill" switch could be integrated into the handle assembly such that when the handle is lifted, the weight of the lid activates the "kill" switch to shut off the motor and thereby prevent rotation of the fan as the lid is lifted from the pan.

An optional secondary cooling system is indicated in the illustrated embodiment. A small fan may be attached to rear motor shaft 86a, FIG. 9, the space 85. This fan draws air downward from above the handle assembly through vent openings 45, FIGS. 6 and 9. Air from this area is cooler than that closer to the lid or the pan edges. At the edges for example heat from the stove burner rises to create a concentrated hot annular area around the pan. The cooling air then passes the batteries and exits outward at slot 25. As shown there are three air outlets below arcuate handle portions 23. This outward flow further helps cooling by keeping hot air from moving up and inward from the pan edge. Empirical testing has shown this second cooling feature is not required, but is optional for increasing battery and/or motor life.

Battery cover 40 may include recessed face 43. As shown it is an aesthetic shape to suggest the convective action within. The recess also adds some added protection against contamination entering the motor cavity by making the cooling air entry opening more indirect by having a raised surface surrounding button 30, FIG. 9.

In accordance with a method of the invention, a pan with a suspension rack is placed on a stove top burner. Food to be cooked is placed on rack, preferably leaving open spaces between the food portions so that air can flow between the food portions. Lid assembly is placed on top of the pan. The stove top burner is energized thereby heating pan floor as well as the air in the enclosed pan cavity. Activation of a switch on the lid assembly energizes motor causing fan to rotate thereby generating an air flow within the pan cavity.

Heat from burner elevates to food cooking temperature in the cavity. The fan assembly causes heated air in the cavity to impact the food surface thereby heating it by convection. It may also be the case that the food is simultaneously heated by conduction as it may absorb some heat from the rack. The food is likely further heated by infrared (radiant) energy emanating from pan floor through open spaces in rack.

Because the food is receiving heat at cooking temperature through as many as three paths (namely, conduction, radiant and convection) simultaneously, it cooks at a much faster rate than it would in an oven or on a stove top. As an example; when frozen french-fries are cooked in a conventional oven according to package directions, they take approximately 45 minutes to thoroughly cook; 20 minutes to preheat the oven to 425° F. and 25 additional minutes to cook at 425° F. A lid assembly according to the invention (e.g., as depicted in the photographs accompanying the priority application) can be placed on a pan and used to cook the same mass of French-fries in 10 minutes using a stove top burner setting of medium. In summary, according to this example, the French-fries are done in approximately one-fourth the time as would be required in a conventional oven.

The average household oven is rated at 3,000 watts and the average stove top is rated at 1,000 watts. The energy units required to cook French-fries in the above example is as follows:
  Oven relative energy units equals 3,000 watts times 45 minutes equals 135,000 relative energy units.
  Stove top relative energy units equals 1,000 watts times 10 equals 10,000 relative energy units.
  Difference in energy units consumed—10,000 divided by 135,000 equals 7.4%.

Thus, French-fries prepared with a lid assembly according to the above example require 92.6% less energy to cook than the same mass of food in a conventional oven.

ADDITIONAL EXAMPLES

Following examples were prepared using the prototype lid assembly depicted in the photographs in the priority application previously incorporated by reference in its entirety, and demonstrate the accelerated food cooking time at below average energy consumption as compared to a conventional oven.

Example 1—Frozen Raw Chicken Wings

Recommended Cooking Time and Temperature in a Conventional Oven:
  Cook Time=23 Minutes
  Cook Temperature=450 F
  Oven Preheat Time=20 Minutes
  Total Cook Time=43 Minutes
  Actual cooking time using the prototype lid assembly:
  Stove Top Burner=Medium Heat
  Total Cook Time=10 Minutes
  Total Cook time reduced by 75%
  Energy consumed reduced by 80-90%

Example 2—Frozen French Fried Potatoes

Recommended Cooking Time and Temperature in a Conventional Oven:
  Cook Time=25 Minutes
  Cook Temperature=425 F
  Oven Preheat Time=20 Minutes
  Total Cook Time=45 Minutes
  Actual cooking time using the prototype lid assembly:
  Stove Top Burner=Medium Heat
  Total Cook Time=10 Minutes
  Total Cook time reduced by 75%
  Energy consumed reduced by 80-90%

Example 3—Frozen Chicken Breast

Recommended Cooking Time and Temperature in a Conventional Oven:
  Cook Time=50 Minutes
  Cook Temperature=350 F
  Total Cook Time=50 Minutes
  Actual cooking time using the prototype lid assembly:
  Stove Top Burner=Medium Heat
  Total Cook Time=18-20 Minutes
  Total Cook time reduced by 60%
  Energy consumed reduced by 70-80%

The above examples are representative of the normal reduction in food cook time and energy consumed when using a lid assembly according to the invention.

Additional means to further accelerate the rate of cooking the food with the present invention includes the insertion of thermally conductive metal inserts into the solid food product. Some examples of solid food product utilizing the thermally conductive metal insert include potatoes, chicken portions such as thighs and breasts, and various cuts of beef, pork and so forth. Said metal inserts are designed to be in direct physical contact with the bottom surface of the pan, and provide physical support means to create an air gap between the bottom of the pan and the solid food product. The solid food product is penetrated by the opposite end of the metal inserts, holding it in place. Heat is conducted from the pan surface through the metal insert and into the solid food product.

Example 4—Raw Potato

In each instance, a raw potato weighing 15 ounces, was heated (baked) to a final internal temperature of 210° F.
Cooking Time and Temperature in a Conventional Oven:
Cook Temperature=400 F
Total Cook Time=50-60 Minutes
Actual cooking time using the prototype lid assembly (without a food insert):
Stove Top Burner=Medium Heat
Total Cook Time=35-40 Minutes
Total Cook time reduced by 34%
Actual cooking time using the prototype lid assembly (with a food insert):
Stove Top Burner=Medium Heat
Total Cook Time=25-30 Minutes
Total Cook time reduced by 50%

In an additional method, the lid assembly of the stove top convection pan assembly according to the invention is disassembled (e.g., by decoupling the handle portion from the air flow generator portion and the cover) and the pan, separated lid assembly components (except the handle) are washed (e.g., by placement in a conventional dishwasher). The handle containing the motor can be washed by hand, and can be stored in a drawer. The other components of the assembly can be stored where conventional pans/lids are stored. Thus, the device makes clean up easy, and does not take up counter space in the kitchen.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A lid assembly for resting on a cooking pan having an opening defined by a rim of the cooking pan, the lid assembly comprising:
a cover portion for spanning and closing off the opening defined by the rim of the cooking pan;
a handle assembly provided on a top surface of the cover portion, the handle assembly including a narrow portion and a flared wide top portion atop the narrow portion;
a motor disposed within a motor cavity in the handle assembly, the motor being configured to rotate a shaft that extends through the cover portion; and
an air stirring-fan attached to an end of the shaft that extends through the cover portion, said air-stirring fan being configured to generate both transverse radial air motion and spin-axis air rotation from rotation of the air-stirring fan by the shaft;
wherein the handle assembly includes a battery compartment in the flared wide top portion,
wherein the battery compartment is configured to house a cylindrical battery for powering the motor,
wherein the narrow portion of the handle assembly surrounds a lower portion of the motor,
wherein the handle assembly includes at least a first external face between the flared wide top portion and the narrow portion, the first external face being below the battery compartment and forming a lifting handle structure for the lid assembly,
wherein the battery compartment is configured to house the cylindrical battery such that the cylindrical battery is at least one-half inch away from the nearest top surface of the cover portion,
wherein the handle assembly further comprises a battery cover and a depressible control button,
wherein a perimeter of the control button, in a non-depressed button position, is elevated above a top side of the of the battery cover,
wherein the control button is depressible parallel to an axis of rotation of the shaft toward the top side of the battery cover to control operation of the motor,
wherein the control button is centrally aligned relative to the axis defined by the shaft,
wherein the battery cover includes a boss and a vent opening located within the boss, and
wherein the control button overlaps the boss.

2. The lid assembly according to claim 1, wherein the handle assembly includes a second external face that is outwardly adjacent to the battery compartment, and wherein the first external face and the second external face together surround the battery compartment from below and beside, respectively.

3. The lid assembly according to claim 2, wherein the battery compartment is configured to support a plurality of batteries such that said plurality of batteries circumferentially surround the motor in a plane perpendicular to an axis of rotation of the shaft.

4. The lid assembly according to claim 3, wherein the battery compartment is configured to support three batteries in a triangular arrangement such that the longitudinal axis of each one of said three batteries intersects with the longitudinal axis of other of said three batteries at a 60 degree angle.

5. The lid assembly according to claim 1, wherein the battery compartment is configured to support a plurality of batteries arranged in a ring that surrounds the motor.

6. The lid assembly according to claim 1, wherein the control button has a diameter at least equal to an axially transverse diameter of the motor.

7. A lid assembly comprising:
a cover portion;
a handle assembly; and
an air flow generator;
wherein the handle assembly is mounted to the cover portion,
wherein the handle assembly includes a motor cavity containing a motor with a rotatable shaft,
wherein the handle assembly includes a battery compartment,
wherein the motor is disposed within a first portion of the handle assembly,
wherein the battery compartment is disposed in a second portion of the handle assembly and a battery cover is atop the battery compartment, wherein the air flow generator is in the form of an air-stirring fan that is configured to be mounted on a shaft that is rotatable by the motor on a side of the cover portion opposite to the handle assembly, said air-stirring fan being configured to generate both transverse radial air motion and spin-axis air rotation from rotation of the air-stirring fan by the shaft, wherein the battery compartment is configured to support and hold a plurality of batteries for powering the motor such that said plurality of batteries are spaced above the cover portion of the lid assembly, wherein the battery cover includes a vent opening, wherein the battery compartment includes an air outlet below the battery cover, wherein an enclosing structure is located above the vent opening of the battery cover, wherein the enclosing structure forms a depressible control button, wherein the control button is disposed on a top side of the battery cover, wherein a perimeter of the control button, in a non-depressed button position, is elevated above the top side of the of the battery cover, wherein the control button is depressible parallel to an axis of rotation of the shaft toward the top side of the battery cover to control operation of the motor, and wherein the control button includes a portion that extends above a top of the battery compartment to form an exposed upper member of the handle assembly.

8. The lid assembly according to claim 7, wherein the battery compartment is configured to support the plurality of batteries in a triangular arrangement.

9. The lid assembly according to claim 7, wherein the battery cover includes a boss and the vent opening is surrounded by the boss, and the control button fits over the vent opening, overlaps the boss of the battery cover and spans across the battery cover to prevent liquids from entering the motor cavity of the handle assembly.

10. The lid assembly according to claim 9 wherein the battery cover is detachable from the handle portion by turning the battery cover on a bayonet fitting.

11. The lid assembly according to claim 8, wherein the battery compartment is configured to house the plurality of batteries such that each of the plurality of batteries housed within the battery compartment is spaced at least one battery diameter apart from a nearest top external face of the cover portion.

12. The lid assembly according to claim 7, wherein control button controls operation of the motor, the control button being fitted over and overlapping a boss of the handle assembly and having an outer diameter at least equal to an axially transverse diameter of the motor.

13. The lid assembly according to claim 12, wherein the control button forms an exposed protrusion on a top side of the handle assembly.

14. A lid assembly comprising:
a cover portion;
a handle assembly; and
an air flow generator;
wherein the handle assembly supports a motor and a battery compartment,
wherein the air flow generator is in the form of an air-stirring fan that is configured to be mounted below the handle assembly on a shaft that is rotatable by the motor on a side of the cover portion opposite to the handle assembly, said air-stirring fan being configured to generate both transverse radial air motion and spin-axis air rotation from rotation of the air-stirring fan by the shaft,
wherein the air-stirring fan has an elongated structure that extends outward from a fan hub to exactly two opposed ends,
wherein a paddle is provided at each of the two opposed ends,
wherein each paddle extends inward from each end and terminates at an inside paddle edge spaced away from the fan hub,
wherein the air-stirring fan includes a central portion adjacent the fan hub that is open and absent of paddles,
wherein the elongated structure includes a shallow S-shape in plan view, and
wherein each paddle is curved in the plan view to form the shallow S shape with advancing faces of each paddle facing outward relative to a radial direction from a spin axis of the air-stirring fan.

15. The lid assembly according to claim 14, wherein the paddles extend upward from the elongated structure to a top paddle edge adjacent to an underside of the cover portion, and wherein the air-stirring fan operates to draw input air from below the air-stirring fan at the central portion adjacent the fan hub.

16. The lid assembly according to claim 14, wherein the elongate structure includes opposed lips along a length of the elongate structure, the respective lips joining to a lower portion of the inside edge of each paddle, and the lips extending upward to form a shallow U shaped airfoil adjacent a location of the fan hub.

* * * * *